United States Patent [19]
Law et al.

[11] Patent Number: 5,494,596
[45] Date of Patent: Feb. 27, 1996

[54] DATA STORAGE DEVICE WITH IMPROVED ROLLER LUBRICANT CHARACTERIZED BY STABLE VISCOSITY OVER WIDE RANGE OF TEMPERATURES

[75] Inventors: Kam W. Law, Woodbury; Mary R. Hable, Stillwater; Miguel A. Guerra, Woodbury, all of Minn.

[73] Assignee: Minnesota Mining and Manufacturing Company, St. Paul, Minn.

[21] Appl. No.: 372,357

[22] Filed: Jan. 13, 1995

[51] Int. Cl.$^6$ .................. C10M 105/18; C10M 105/54; C10M 107/34; C10M 107/38
[52] U.S. Cl. .................. 252/54; 252/52 A; 242/340; 242/352.4
[58] Field of Search .................. 252/52 A, 54; 242/348.8, 352.4

[56] References Cited

U.S. PATENT DOCUMENTS

| | | | |
|---|---|---|---|
| 3,692,255 | 9/1972 | Von Behren | 242/343.2 |
| 4,406,801 | 9/1983 | Onopchenko et al. | 252/46.7 |
| 4,507,214 | 3/1985 | Aldorf | 252/18 |
| 4,581,189 | 4/1986 | Smith et al. | 264/131 |
| 4,675,452 | 6/1987 | Lagow et al. | 568/601 |
| 4,711,523 | 12/1987 | Iri et al. | 350/96.23 |

Primary Examiner—Jerry D. Johnson
Attorney, Agent, or Firm—Gary L. Griswold; Walter N. Kirn; David B. Kagan

[57] ABSTRACT

A data storage device of the type having a rotating member mounted on a shaft, said data storage device comprising a lubricant provided between the shaft and the rotating member, wherein the lubricant comprises (a) a linear, nonpolar polyether base oil having a glass transition temperature ($T_g$) of about −110° C. or less and an activation energy of flow ($E_a$) of about 30 kJ/mol or less, and (b) an amount of a thickening agent sufficient to provide the lubricant with a grease-like consistency.

15 Claims, 1 Drawing Sheet

DATA STORAGE DEVICE WITH IMPROVED ROLLER LUBRICANT CHARACTERIZED BY STABLE VISCOSITY OVER WIDE RANGE OF TEMPERATURES

FIELD OF THE INVENTION

This invention is in the field of belt-driven magnetic recording tape cartridges such as are described in U.S. Pat. No. 3,692,255 (Von Behren). More specifically, this invention relates to an improved roller lubricant for such belt-driven magnetic recording tape cartridges.

BACKGROUND OF THE INVENTION

The belt-driven tape cartridges of the Von Behren patent, U.S. Pat. No. 3,692,255, incorporated herein by reference, are commonly referred to as "data cartridges." A data cartridge typically includes a housing defining a thin, generally rectangular enclosure. The housing contains a length of magnetic recording tape which is wound upon a pair of tape reel hubs. The magnetic recording tape is driven by an elastomeric drive belt which, in turn, is driven by a single, reversible drive motor. The drive belt provides rapid acceleration and deceleration of the recording tape in either direction. The drive belt is stretched along a drive belt path generally defined by a drive roller, a pair of corner rollers, and part of the tape pack wound on each hub.

The tape, driven by the drive belt, is under a certain amount of tension during operation of the data cartridge. The tape tension must not fall below a certain level as the tape passes from hub to hub or else contact between a read/write head and the tape may be insufficient to allow successful data transfer. Conversely, the maximum drive force, i.e., the force which must be applied to rotate the cartridge drive roller, must not exceed the power rating of the motor in the associated drive. In short, data cartridges must meet minimum tape tension specifications while simultaneously operating within maximum allowable drive force specifications to achieve acceptable performance of a data cartridge in a drive. Meeting both specifications may be difficult, especially since drive force is at least partially dependent on tape tension, meaning that an increase in tape tension has the effect of increasing drive force.

To further optimize data cartridge performance, it is extremely desirable to maintain uniform minimum tape tension and operate within specified drive force parameters during recording and playback. Changes in temperature, for example, may cause tape tension and drive force characteristics to vary considerably. This variability may lead to undesirable consequences such as stalling of the drive at low operating temperatures or insufficient tape tension at high operating temperatures. Therefore, reducing the temperature dependence of tape tension and drive force characteristics will improve data cartridge performance.

SUMMARY OF THE INVENTION

The present invention concerns an improved roller system that provides extremely stable tape tension and drive force characteristics over a wide range of temperatures. The advantages of the present invention are achieved by a data storage device, such as but not limited to a data cartridge, of the type having a rotating member mounted on a shaft. The rotating member may be, for example, a corner roller, a drive roller, or a tape reel hub. A lubricant is provided between the shaft and the rotating member. The lubricant comprises a linear, nonpolar polyether base oil and a thickening agent. The base oil has a glass transition temperature, $T_g$, of $-110°$ C. or less and an activation energy of flow, $E_a$, of about 30 kJ/mol or less. The thickening agent is present in an amount sufficient to provide the lubricant with a gmase-like consistency.

The present invention is based in part upon our discovery that the variation in tape tension and drive force in the data cartridge with changes in temperature is caused, in part, by the temperature dependence of the lubricant's viscosity. We have also discovered that the class of lubricants whose base oils have a low activation energy of flow ($E_a$) and low glass transition temperature ($T_g$) as defined herein are characterized by extremely stable viscosity over a wide range of operating temperatures. Accordingly, the use of such lubricants in a data cartridge provides substantially more uniform tape tension and drive force over a wide range of operating temperatures as compared to other lubricants having higher values of $E_a$ and/or $T_g$. The lubricants of the present invention are particularly suitable for use in a data cartridge at the interface between the corner rollers and their corresponding shafts.

DESCRIPTION OF THE PREFERRED EMBODIMENTS

Figure 1:
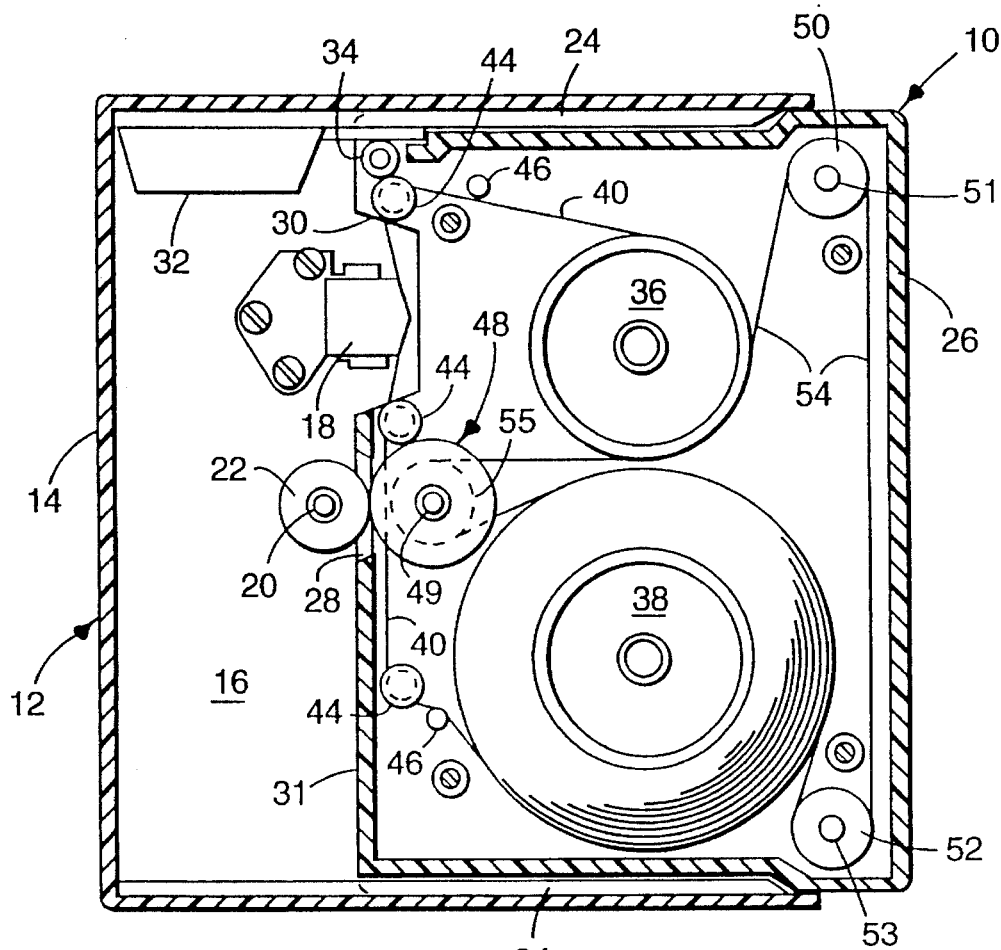
FIG. 1 is a broken-away top view of a tape cartridge inserted in a data cartridge drive.

Referring now to FIG. 1, there is shown one example of a belt-driven data cartridge 10 according to the present invention. The cartridge 10 is shown engaged with a magnetic recording apparatus 12. As used herein, "magnetic recording apparatus" means an apparatus for recording or reproducing information that is stored on magnetic or optical recording tape. The magnetic recording apparatus 12 comprises a support frame 14 including a horizontal cartridge support deck 16 supporting a magnetic transducer head 18. The support deck 16 also supports, in a depending manner, a reversible drive motor (not shown), the shaft 20 of which extends through the support deck 16. A drive puck 22 is mounted on the shaft 20 above the support deck 16. Elongate guides 24 define the position of the cartridge 10 on the support deck 16.

The cartridge 10 includes a housing 26 which includes drive access means. In FIG. 1, drive access means comprises openings 28 and 30 which are located on one edgewall 31 of the housing 26. The opening 28 provides access for the drive puck 22. The opening 30 provides access for the transducer head 18. The opening 30 is covered by a door 32 which is biased by a torsion spring 34 towards a closed position covering the opening 30.

A pair of tape reel hubs 36 and 38 are rotatably mounted on shafts 37 and 39, respectively, on parallel axes inside housing 26. A length of magnetic recording tape 40 is wound on the hubs 36 and 38 such that a portion of the tape 40 extends from one hub to the other hub and across opening 30. Means for defining a tape path in the housing to guide the tape 40 from one hub to the Other hub and across the opening 30 includes guide pins 44 and 46. Means for defining a drive belt path includes a drive belt roller 48 rotatably mounted on a shaft 49, part of the tape 40 wound on each hub 36 or 38, and belt corner rollers 50 and 52 rotatably mounted on shafts 51 and 53, respectively. The drive belt 54 of the present invention extends along the drive belt path such that the drive belt 54 frictionally engages a portion of the magnetic recording tape 40 to cause transport of the tape 40 from one hub to the other hub. The length of the unstretched drive belt 54 is less than the length of the drive belt path so that the belt 54 is stretched when inserted into the cartridge 10.

When the cartridge 10 is engaged with the magnetic recording apparatus 12 as shown in FIG. 1, the drive puck 22 contacts the belt drive roller 48 through the opening 28, and the transducer head 18 contacts the tape 40 through the opening 30. A belt-contacting portion 55 of the drive belt roller 48 is recessed to permit the tape 40 to pass across the drive belt roller 48 without touching the drive puck 22. Cartridges such as cartridge 10 and their operation have been described in U.S. Pat. Nos. 3,692,255 and 4,581,189.

Figure 2:
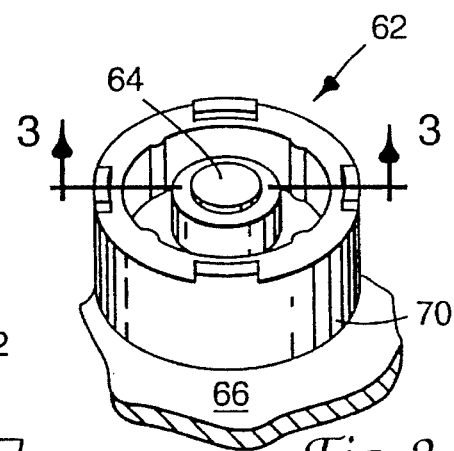
FIG. 2 is a perspective view of a portion of the inside of a data cartridge showing a corner roller mounted on a corner roller shaft.
Figure 3:
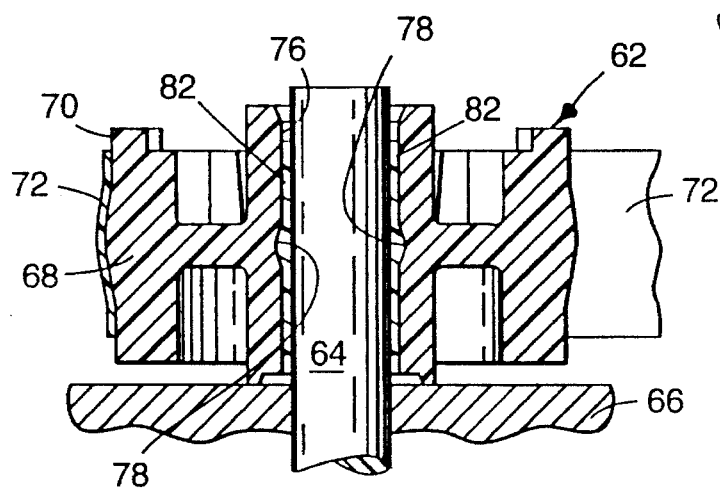
FIG. 3 is a cross-sectional view of the corner roller mounted on a corner roller shaft of FIG. 2 taken along line 3—3.

FIGS. 2 and 3 show a portion of the inside of a data cartridge which includes a corner roller suitable in the practice of the present invention. A corner roller 62 is rotatably mounted on a shaft 64. The shaft 64 is mounted in a baseplate 66 such that the corner roller 62 rotates about an axis which is perpendicular to the baseplate 66. As shown in FIG. 3, the corner roller 62 includes a body 68 which has an external periphery 70 for guiding a drive belt 72 (shown in FIG. 3, but not shown in FIG. 2). The corner roller 62 also has a central bore defined by an inner periphery 76. The central bore is adapted to receive the shaft 64. Generally, configuring the central bore with a diameter approximately 1.1 mils (0.028 mm) greater than the diameter of the shaft 64 has been found to be suitable in the practice of the present invention. For purposes of clarity, the space between the shaft 64 and the inner periphery 76 has been exaggerated in FIG. 3. We have also found that it is desirable for the inner periphery 76 to have a surface roughness (Ra) of 22 microinches (0.56 μm) to 38 microinches (0.96 μm), preferably about 28 microinches (0.71 μm). In the practice of the present invention, surface roughness (Ra) is measured using a Taylor-Hobson Talysuff 10 apparatus.

As seen best in FIG. 3, the external periphery 70 is configured with a slight crown to help prevent the drive belt 72 from shifting away from a centered position on the external periphery 70 as the drive belt 72 is guided by the corner roller 62. See, e.g., von Behren et al., "Mechanical Design of a Belt-Driven Data Cartridge," *Adv. Info. Storage Syst.* 1 (1991), pp. 49–59 for a discussion of this design. FIG. 3 also shows that the shaft 64 extends slightly above the top of the central bore. FIG. 3 also shows a slight sink 78, i.e., concavity, on the inner periphery 76. When the corner roller 62 is formed from a polymeric material, the sink 78 forms naturally as the corner roller cools after being released from its mold, because the walls of body 68 of the corner roller 62 are thicker around its center than at its ends. Advantageously, the sink forms a chamber for holding the lubricant 82.

The shaft 64 can be made from a wide variety of materials. Preferably, the shaft 64 is formed with at least a metal coating or more preferably is entirely formed from a metal. A preferred metal material is hardened steel (SAE 52100, $R_c \geq 60$). The corner roller 62 can also be made from a wide variety of materials, but is preferably formed from a thermoplastic or thermosetting resin such as polytetrafluoroethylene, high density polyethylene, polyamide, polyurethane, polyacetal resin, or a carbon-fiber reinforced polyacetal resin.

In order to reduce the temperature dependence of the drag force and tape tension, the lubricant 82 according to the present invention is provided on the interface between any of the rotating members in the data cartridge such as drive rollers, corner rollers, or tape reel hubs and their corresponding shafts. Most advantageously, the lubricant is provided on the interface between one or more of the corner rollers and their corresponding shafts.

In the practice of the present invention, the lubricant comprises a linear, nonpolar polyether base oil and a thickening agent, wherein the base oil has an activation energy of flow, $E_a$, of about 30 kJ/mol or less and a $T_g$ of −110° C. or less. Preferably, the $E_a$ of the base oil is less than about 25 kJ/mol, and more preferably is less than about 22 kJ/mol. The $T_g$ of the base oil is preferably in the range from −125° C. to −150° C., more preferably −130° C. to −135° C.

While not wishing to be bound by theory, we can present a possible rationale as to why a base oil having such $E_a$ values is desirable. When flow takes place in a fluid, it is opposed by internal friction arising from forces such as intermolecular attractive forces, steric hindrance, entanglements between neighboring molecules, and rotational energy of flow. The intermolecular attractive forces may include Van der Waals forces, dipole-dipole interactions, hydrogen bonding, or dipole-induced dipole interactions. Rotational energy of flow refers to the energy needed to rotate bonds to conform to and pass steric hindrances. The internal friction caused by forces such as those described above is the property of the fluid known as viscosity. Molecules must overcome this internal friction in order to flow; the required force is characterized by a property known as the activation energy of flow ($E_a$).

We have discovered that the property $E_a$ of the base oil can be optimized to minimize the temperature dependence of a lubricant's viscosity. For example, the relationship between viscosity as a function of temperature and $E_a$ for a base oil is represented quite satisfactorily by the Andrade equation:

$$\eta(T) = A_o(e^{E_a/RT}) \qquad (1)$$

wherein $\eta(T)$ is the viscosity at a temperature T;

$A_o$ is a constant;

$E_a$ is the activation energy of flow;

R is the gas constant; and

T is temperature.

By taking the derivative of this equation with respect to temperature, the following equation is obtained:

$$d\eta/dT = -A_o E_a/RT^2(e^{E_a/RT}) \qquad (2)$$

Equation 2 shows that the magnitude of the temperature dependence of viscosity grows exponentially with Ea. This means that base oils with lower $E_a$ will show more stable viscosity over a range of temperatures as compared to base oils with higher $E_a$ values.

To determine $E_a$ by one preferred method, the logarithm of Equation 1 is taken to give the following equation:

$$\ln \eta(T) = \ln A_o + E_a/RT \qquad (3)$$

The viscosity of a base oil is then measured over a range of temperatures at a controlled shear rate. After obtaining the viscosity and corresponding temperature data, a plot of $\ln \eta$ versus 1/T is made. We have found that this plot yields a substantially straight line. For example, the coefficient of correlation of the best fit line is typically 0.9 or higher for such data. The slope of the resultant line is equal to $E_a/R$ as shown by Equation 3. In SI units, R has the value 8.3 $14\times10^{-3}$ kJ/mol-K. Generally, the slope of the line $\ln \eta$ versus 1/T can be calculated using the least squares method. A steep slope, indicating a large $E_a$, means that the sample has a relatively large temperature dependence-of viscosity. On the other hand, a shallower slope indicates that the sample has a lower temperature dependence of viscosity.

A particularly preferred technique for obtaining the viscosity and corresponding temperature data required for the above analysis includes using a Haake Rotovisco RV 100 cup-and-cylinder Searle type viscometer with a computer-controlled temperature and shear rate cycle having a duration of 255 minutes. To begin the cycle, the lubricant sample is maintained at 10° C. while the shear rate is increased at a substantially constant rate from zero to 15,000 $s^{-1}$ over a period of 30 minutes. The sample is then maintained at the shear rate of 15,000 $s^{-1}$ for an additional 15 minutes. After the additional 15 minutes have passed, the temperature of the sample is increased from 10° C. to 60° C. at a substantially constant rate over a period of 120 minutes while maintaining the shear rate at 15,000 $s^{-1}$. The viscosity values at various temperatures during this 120-minute period are collected. The resultant data for viscosity and temperature can then be used to calculate $E_a$ as described above.

$E_a$ of the base oil is not the only property that can be used to characterize the temperature dependence of the lubricant viscosity. Molecular flexibility is another such property. Relatively flexible molecules tend to have more stable viscosities over wider temperature ranges as compared to relatively less flexible molecules. With increasing internal friction, the flexibility of the lubricant molecules, i.e. their ability to bend or rotate in the bulk, decreases due to increased steric hindrance, entanglement and intermolecular attractive forces. We have found that glass transition temperature, $T_g$, is an excellent indicator of a lubricant molecule's flexibility. Lubricants characterized by a lower $T_g$ tend to be more flexible. Thus, a base oil with a relatively low $T_g$ tends to have a relatively low temperature dependence of viscosity. Accordingly, the base oil of this invention has a $T_g$ of $-110°$ C. or less, preferably in the range from $-125°$ C. to $-150°$ C., more preferably $-130°$ C. to $-135°$ C. In addition, the proportion of oxygen in a molecule also has been observed to be an indicator of molecular flexibility because bonds containing oxygen tend to require relatively less rotational energy to pass steric hindrances. For example, a polyether containing primarily $-CH_2O-$ groups would be expected to be more flexible, and therefore would have a more stable viscosity, than one containing primarily $-CH_2CH_2O-$ groups because of the higher proportion of C—O bonds in the polyether containing the $-CH_2O-$ groups.

The glass transition temperature, $T_g$, of the base oil is typically determined using the differential scanning calorimetry (DSC) method, although other methods such as thermally stimulated current discharge analysis (TSC) are also available. According to one particularly preferred technique for determining $T_g$, a Perkin-Elmer DSC 7 apparatus is used with a scanning range from $-150°$ C. to 20° C. and a scanning rate of 20° C. per minute. The onset temperature of the glass transition is taken to be the $T_g$. The onset temperature has been defined in ASTM method D3418. A method for calculating the onset temperature using the Perkin-Elmer DSC 7 apparatus is described in the operating manual at pages 7–53 through 7–56.

In the practice of the present invention, the term "linear" with respect to the base oil means that the base oil is characterized by a linear molecular chain. Generally, molecules with a linear molecular chain tend to be more flexible and therefore are characterized by a lower $E_a$ and a lower $T_g$ as compared to branched chain molecules. Thus, the temperature dependence of a lubricant's viscosity is reduced by the use of base oils with a linear molecular chain.

The term "polyether" with respect to the base oil means that the backbone of the base oil comprises a repeating unit wherein such repeating unit contains a C—O bond. The polyethers of the present invention may contain one or more different kinds of such repeating units. Preferred embodiments of polyethers will be described in more detail below.

The term "nonpolar" with respect to a base oil means that the end groups of the base oil have substantially no hydrogen bonding ability or electron withdrawing or donating ability when considered in conjunction with the rest of the molecule to which the end groups are attached. Examples of nonpolar end groups suitable in the practice of the present invention include monovalent lower alkyl moieties of 1 to 10 carbon atoms, preferably 1 to 4 carbon atoms; and monovalent lower perfluoroalkyl moieties of 1 to 10 carbon atoms, preferably 1 to 4 carbon atoms. Preferably, the lower alkyl or lower perfiuoroalkyl moieties are linear. Particularly preferred examples of such moieties include $CH_3-$, $CF_3-$, $CF_3CF_2-$, $CH_3CH_2-$, and the like.

The nonpolar or polar character of an end group may be affected by the nature of the moiety adjacent to it on the molecular chain. For example, a perfluoroalkyl end group adjacent to an alkyl moiety will be polar, whereas the same end group adjacent to a more chemically similar peffluoroalkyl or perfluorooxyalkyl moiety will be nonpolar. Similarly, an alkyl end group will be polar when adjacent to a peffluoroalkyl or perfluorooxyalkyl moiety, but nonpolar if adjacent to an alkyl moiety. Generally, base oils with nonpolar end groups have less internal friction due to intermolecular attractive forces as compared to base oils with polar end groups. Inasmuch as reducing intermolecular attractive forces reduces the $E_a$ of a lubricant, the use of nonpolar end groups tends to reduce the temperature dependence of a lubricant's viscosity.

In one preferred embodiment, the base oil of the present invention is a polyether represented by the formula

$$W-O-(Z)_m-W \qquad (4)$$

Each W is independently a nonpolar, linear alkyl group of 1–10 carbon atoms and is preferably $CH_3-$. Z comprises at least one linear oxyalkylene moiety of the formula $-(C_nH_{2n}O)-$. The integer n has a value of 2 to 10, preferably 2 to 4, and most preferably 2. The integer m has a value such that the number average molecular weight of the polyether is in the range from 200 to 2000, preferably about 400. In those instances in which Z comprises more than one different kind of linear oxyalkylene moiety, e.g., a combination of $-(C_2H_4O)-$ and $-(CH_2O)-$ groups, the different groups may be either randomly distributed or grouped in blocks in the chain. Preferably, the polyether of formula (4) is a linear polyethylene glycol dimethyl ether having the formula

$$CH_3O(CH_2CH_2O)_mCH_3 \qquad (5)$$

wherein m has a value such that the compound has a molecular weight of about 400.

In another preferred embodiment of the present invention, the base oil is a perfluoropolyether represented by the formula

In this formula, each $W_f$ is independently a monovalent, linear, nonpolar perfluoroalkyl group having from 1 to 20 carbon atoms, preferably 1 to 4 carbon atoms, and more preferably is —$CF_3$. Z' comprises at least one linear oxyperfluoroalkylene moiety of the formula —$(C_nF_{2n}O)$—. The integer n has a value of 1 to 10, more preferably 1 to 4. The integer m has a value such that the linear perfluoropolyether has a molecular weight in the range from 500 to 10,000, preferably 2,000 to 10,000, and more preferably 4,000 to 8,000. A general discussion of the properties and methods of preparation of these materials is found in George R. Lappin and Joe D. Sauer, eds., *Alpha Olefins Applications Handbook* (New York: Marcel Dekker, 1989), p. 353. Linear perfluoropolyethers are commercially available from Ausimont USA, Inc. under the FOMBLIN tradename and Daikin Industries, Ltd. under the DEMNUM tradename.

In those instances of the perfluoropolyethers of Formula (6) wherein Z' comprises more than one kind of oxyperfluoroalkylene moiety, e.g., a combination of —$(CF_2O)$— and —$(CF_2CF_2O)$— groups, the different groups may be either randomly distributed or grouped in blocks in the chain. Specific examples of more preferred linear perfluoropolyethers according to Formula (6) include:

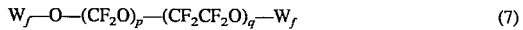

wherein the oxyperfluoroalkylene groups, —$CF_2CF_2O$— and —$CF_2O$—, are either randomly distributed or grouped in blocks in the chain, p is an integer from 1 to 200, preferably 20 to 80, q is an integer of 1 to 200, preferably 20 to 80, each $W_f$ is independently a nonpolar end group as described above, and more preferably is $CF_3$— or $CF_3CF_2$—. The ratio p/q is preferably in the range from 0.5 to 100, and most preferably is about 22. This ratio may be determined by nuclear magnetic resonance (NMR) spectroscopy.

The presence of the thickening agent not only tends to provide the lubricant with a grease-like consistency, but it also provides the lubricant with a lower $E_a$ as compared to the base oil by itself, thereby reducing the temperature dependence of viscosity of the resulting lubricant as compared to the base oil. Generally, using 1 to 60, preferably 10 to 40 and more preferably 20 to 30 parts by weight of the thickening agent together with 40 to 99 parts by weight of the base oil has been found to be suitable in the practice of the present invention. The resulting lubricant preferably has a viscosity less than or equal to about 2 Pa-s at 22° C. at a shear rate of 15,000 s$^{-1}$.

A wide variety of thickening agents are suitable in the practice of the present invention, including metallic salts of a fatty acid wherein the counterion is an ion of Ba, Si, Zn, Pb, K, Na, Cu, Mg, Sr, Ca, Li, Al, and the like; clays; polyureas such as those having 2–20 urea bonds and a molecular weight of 100 to 50,000; cellulose derivatives; fluorinated resin particles; fatty acid esters of dextrin; carbon black; silicon dioxide; aluminum complexes; and the like. Thickening agents have been described in U.S. Pat. Nos. 4,711,523, 4,507,214, and 4,406,801.

In preferred embodiments of this invention, the lubricant comprises a polyether base oil and one or more thickening agents including fluorinated resin particles. In a particularly preferred embodiment, the base oil is a linear perfluoropolyether and the fluorinated resin particles are substantially spherical and preferably less than one micron in diameter, more preferably 0.05 microns to 0.5 microns in diameter, and most preferably about 0.1 microns in diameter. The size of individual particles is generally measured using a method such as transmission electron microscopy (TEM). A relatively smaller fluorinated resin particle size is desirable to achieve the proper grease-like consistency without an excessively high loading of fluorinated resin particles in the lubricant. The fluorinated resin particles act as both a thickening agent and an anti-wear agent for the rotating member which the lubricant contacts. In addition to providing lubricating properties, the linear perfluoropolyether base oil serves as a dispersant for the fluorinated resin particles so that no additional dispersing agents are required in the lubricant. A preferred lubricant Comprising a linear perfluoropolyether and a thickening agent of fluorinated resin particles is commercially available under the designation 899-1 from Nye Lubricants, Inc. A more preferred lubricant is a modified formulation of 899-1 lubricant containing 20% by weight fluorinated resin particles.

Preferred fluorinated resin particles are characterized by a surface energy of less than about 30 dyn/cm and a surface area of at least 9 m$^2$/g. More preferably, the surface area is at least 20 m$^2$/g. For the purposes of this invention, surface area of the particles is measured by nitrogen absorption using a Model 4200 Automatic Surface Area Analyzer from Lees & Northrup Instruments. The measured area of the particles includes the internal or porous surface area.

The fluorinated resin particles can be made from any of a variety of suitable fluorinated resins. Examples of suitable fluorinated resins include polytetrafluoroethylene (PTFE), polyhexafluoropropylene, perfluoroalkyl vinyl ethers, and the like. The use of fluorinated resins for making fluorinated resin particles has been described in U.S. Pat. Nos. 4,724,092 and 4,472,290. Preferably the fluorinated resin is PTFE with a number average molecular weight in the range from 2,000 to 100,000. Fluorinated resin particles are commercially available either dispersed in a solvent or as a dry powder. Preferably, the fluorinated resin particles are present in the amount of between 1 and 40 parts by weight per 100 parts of the lubricant, and more preferably between 1 and 30 parts by weight per 100 parts of the lubricant, and most preferably about 20 parts by weight per 100 parts of the lubricant. Examples of suitable fluorinated resin particles are those which are commercially available from E. I. Dupont de Nemours and Co. under the VYDEX and TEFLON tradenames, Ausimont USA, Inc. under the ALGOFLON and HALON tradenames, Daikin Industries, Ltd. under the POLYFLON tradename, Hoechst AG under the HOS TAFLON tradename, and Imperial Chemical Industries, PLC (ICI) under the FLUON tradename. Particularly preferred particles are MP 1000 TEFLON particles, MP 1600 TEFLON particles and VYDEX GT particles, all manufactured by E. I. Dupont de Nemours and Co., because of their relatively small particle size.

The lubricant of the present invention can be applied to the interface between any rotating member in the data cartridge and its corresponding shaft. For example, referring to FIG. 1, the lubricant can be used between one or both corner rollers 50 and 52 and their corresponding shafts 51 and 53, the drive roller 48 and its shaft 49, and/or one or both tape reel hubs 36 and 38 and their corresponding shafts 37 and 39. Preferably, as shown in FIG. 3, the lubricant 82 is used between the corner roller 62 and its shaft 64. The lubricant of the present invention can be applied between a roller and its shaft in a variety of ways. For example, the lubricant can be first applied to the shaft after which the roller is mounted on the lubricated shaft. Alternatively, the lubricant can be applied to the inner periphery of the roller first after which the roller is then mounted on the shaft. As another alternative, the lubricant can be applied to both the shaft and the roller, after which the roller is mounted on the shaft.

The amount of lubricant applied between the roller and the shaft can be varied depending upon the viscosity of the lubricant and the desired level of drag force. However, if too little lubricant is used, the drag force may become too high or be unstable. If too much lubricant is used, the excess lubricant can migrate out from between the corner roller and the shaft. Generally using an amount of lubricant sufficient to occupy 60 percent to 100 percent, more preferably about 100 percent, of the volume of the central bore remaining after the roller is mounted on its shaft has been found to be suitable in the practice of the present invention.

The present invention will now be further described with reference to the following examples.

EXAMPLE 1

A lubricant of this invention, hereinafter referred to as Lubricant 1A, was evaluated for performance as a lubricant when used in a data cartridge. Lubricant 1A was a grease containing a linear nonpolar perfluoropolyether base oil having an $E_a$ of 21.9 kJ/mol and a $T_g$ of −131.3 °C., and PTFE particles. Another lubricant was evaluated for comparison. The comparative lubricant contained a first synthetic hydrocarbon base oil having an $E_a$ of 35 kJ/mol and a $T_g$ of −93.4° C., a second synthetic hydrocarbon base oil having an $E_a$ of 43.2 kJ/mol and a $T_g$ of −79.1 °C., PTFE particles and a thickening agent.

Performance of the lubricants was measured as the change in minimum tape tension ($\Delta T$) and the change in maximum drive force ($\Delta D$). To conduct the test, the lubricant was placed between the corner rollers and the corresponding shafts of a standard, commercially available data cartridge. The data cartridge was inserted into a magnetic recording drive adapted to monitor and record tape tension and drive force levels via computer control. Tape tension was measured at the point where the tape contacts the head. Each cartridge was first operated continuously at a controlled speed of 60 ips (152.4 cm/sec) for about 40% of the total tape length, or about 400 ft., while tape tension was recorded. Afterwards, drive force was recorded at 120 ips (302.8 cm/sec) for the remaining length of the tape (about 600 ft.). The minimum tape tension and maximum drive force values were then selected from the resulting data. The test was repeated three times for each sample using three different data cartridges, and average minimum tape tension and average maximum drive force values were calculated from the three tests.

The testing described above was repeated at three different controlled environmental conditions: "HL" (45° C. and 10% relative humidity), "RT" (25° C. and 20% relative humidity), and "LL" (5° C. and 10% relative humidity).

The change in minimum tape tension ($\Delta T$), which is the difference between the average minimum tape tensions at the LL and HL conditions, and the change in maximum drive force ($\Delta D$), which is the difference between the average maximum drive forces at the LL and HL conditions, are shown in the table below.

| Lubricant | base oil $E_a$ [kJ/mol] | base oil $T_g$ [°C.] | $\Delta T$ [oz] | $\Delta D$ [oz] |
| --- | --- | --- | --- | --- |
| Lubricant 1A | 21.9 | −131.3 | 0.47 | 1.67 |
| Comparative lubricant | 37.6 | −88.6 | 0.78 | 2.72 |

This data shows that Lubricant 1A, having the lower $E_a$ and $T_g$, is less temperature dependent than the comparative lubricant with regard to performance in a data cartridge.

EXAMPLE 2

A lubricant, hereinafter referred to as Lubricant 2A, was prepared as follows: 495 g of MP 1600 TEFLON fluorinated resin particles (E. I. Dupont de Nemours and Co.) were combined with 1755 g of a perfluoropolyether base oil having the formula $CF_3O(CF_2)_p(CF_2CF_2)_qCF_3$, wherein p/q=1.27 and a molecular weight of about 9500, the base oil having an $E_a$ of 22.0 kJ/mol and a $T_g$ of −131.1° C. (Z15 perfluoropolyether made by Ausimont USA, Inc.). The resulting mixture was mixed for 30 minutes to produce a lubricant having a viscosity of 0.7 Pa-s at a shear rate of 15,000 $s^{-1}$ and a temperature of 22° C.

A lubricant, hereinafter referred to as Lubricant 2B, was prepared as follows: 60 g of MP1000 TEFLON fluorinated resin particles (E. I. Dupont de Nemours and Co.) was combined with 300 g of the same base oil used for Lubricant 2A. The resulting mixture was mixed to produce a lubricant having a viscosity of 0.7 Pa-s at a shear rate of 15,000 $s^{-1}$ and a temperature of 22° C.

Lubricants 2A and 2B were then tested for performance by measuring corner roller drag force stability at conditions referred to as "HL" (45° C., 10% R.H.), "LL" (5° C., 10% R.H.), and "RT" (25° C., 50% R.H.). Corner roller drag force stability is measured as the change in corner roller drag force over 5000 passes in a drag force tester. Results are shown in the following table.

| Lubricant | Drag force stability [oz.](standard deviation) | | |
| --- | --- | --- | --- |
| | HL | RT | LL |
| Lubricant 2A | 0.72 (0.02) | 0.95 (0.03) | 1.86 (0.41) |
| Lubricant 2B | 0.62 (0.03) | 0.74 (0.06) | 0.76 (0.10) |

Both lubricants exhibited stable drag force at HL and RT conditions, while only Lubricant 2B was stable at LL conditions.

Other embodiments of this invention will be apparent to those skilled in the art upon consideration of this specification or from practice of the invention disclosed herein. Various omissions, modifications, and changes to the principles described herein may be made by one skilled in the art without departing from the true scope and spirit of the invention which is indicated by the following claims.

What is claimed is:

1. A data storage device of the type having a rotating member mounted on a shaft, said data storage device comprising a lubricant provided between the shaft and the rotating member, wherein the lubricant comprises (a) a linear, nonpolar polyether base oil having a glass transition temperature ($T_g$) of about −110° C. or less and an activation energy of flow ($E_a$) of about 30 kJ/mol or less, and (b) an amount of a thickening agent sufficient to provide the lubricant with a grease-like consistency.

2. The data storage device of claim 1, wherein the $T_g$ of the base oil is in the range from −125° C. to −150° C., and the $E_a$ of the base oil is less than about 25 kJ/mol.

3. The data storage device of claim 1, wherein the $T_g$ of the base oil is in the range from −130° C. to −135° C., and the $E_a$ of the base oil is less than about 22 kJ/mol.

4. The data storage device of claim 1, wherein the base oil comprises a polyether having the formula $$W-O-(Z)_m-W$$

wherein each W is independently a monovalent, nonpolar alkyl group having from 1 to 10 carbon atoms, Z comprises at least one linear oxyalkylene moiety of the formula —$(C_nH_{2n}O)$—, n is an integer having a value in the range from 2 to 10, and m is integer having a value such that the number average molecular weight of the polyether is in the range from 200 to 2000.

5. The data storage device of claim 4, wherein W is —$CH_3$.

6. The data storage device of claim 5, wherein Z is —$CH_cH_2O$—, and m has a value such that the number average molecular weight of the base oil is about 400.

7. The data storage device of claim 1, wherein the base oil comprises a perfluoropolyether having the formula $$W_f-O-(Z')_m-W_f$$

wherein each $W_f$ is independently a monovalent nonpolar, perfluorinated group having from 1 to 20 carbon atoms, Z' is a divalent perfluorinated moiety which comprises at least one linear oxyperfluoroalkylene moiety of the formula —$(C_nF_{2n}O)$—, n is an integer having a value of between 1 and 10, and m is an integer having a value such that the number average molecular weight of the perfluoropolyether is in the range from 500 to 10,000.

8. The data storage device of claim 7, wherein the perfluoropolyether has the formula $$W_f-O-(CF_2O)_p(CF_2CF_2O)_q-W_f$$

wherein the —$(CF_2CF_2O)$— and —$(CF_2O)$— moieties are either randomly distributed or grouped in blocks in the chain, p is an integer from 1 to 200, and q is an integer from 1 to 200.

9. The data storage device of claim 8, wherein the ratio p/q is between 0.5 and 100.

10. The data storage device of claim 8, wherein each $W_f$ is independently selected from the group consisting of —$CF_3$, —$CF_2CF_3$, —$CF_2CF_2CF_3$, and —$CF_2CF_2CF_2CF_3$.

11. The data storage device of claim 8, wherein each $W_f$ is —$CF_3$ and the ratio p/q is 22.

12. The data storage device of claim 8, wherein $W_f$ is —$CF_2CF_3$.

13. The data storage device of claim 1, wherein the lubricant comprises:

40 to 99 parts by weight of the base oil; and 1 to 60 parts by weight of the thickening agent.

14. The data storage device of claim 13, wherein the thickening agent comprises a plurality of fluorinated resin particles.

15. The data storage device of claim 7, wherein the perfluoropolyether has a number average molecular weight in the range from 2000 to 16,000.

* * * * *

UNITED STATES PATENT AND TRADEMARK OFFICE
CERTIFICATE OF CORRECTION

PATENT NO. : 5,494,596
DATED : Feb. 27, 1996
INVENTOR(S) : Law et al.

It is certified that error appears in the above-indentified patent and that said Letters Patent is hereby corrected as shown below:

Col. 2, line 5, "gmase-like" should be --grease-like--.

Col. 2, line 67, "Other" should be --other--.

Col. 3, line 48, "yon Behren" should be --von Behren--.

Col. 4, line 56, "Ea" should be --$E_a$--.

Col. 5, lines 5/6, "8.3 14x10$^{-3}$" should be --8.314x10$^{-3}$--.

Col. 6, lines 32/33, "peffluoroalkyl" should be --perfluoroalkyl--.

Col. 6, line 35, "peffluoroalkyl" should be --perfluoroalkyl--.

Col. 8, line 12, "Comprising" should be --comprising--.

Col. 10, line 32, "Comer" should be --- Corner ---.

Col. 11, line 18, "--$CH_cH_2O$--" should be -- --$CH_2CH_2O$-- --.

Signed and Sealed this

Fourth Day of March, 1997

Attest:

BRUCE LEHMAN

Attesting Officer

Commissioner of Patents and Trademarks